(12) United States Patent
Zhang et al.

(10) Patent No.: US 10,127,137 B2
(45) Date of Patent: Nov. 13, 2018

(54) METHODS AND SYSTEMS FOR INCREASED DEBUGGING TRANSPARENCY

(71) Applicants: Fengwei Zhang, Fairfax, VA (US); Kevin Leach, Charlottesville, VA (US); Angelos Stavrou, Fairfax, VA (US); Haining Wang, Fairfax, VA (US)

(72) Inventors: Fengwei Zhang, Fairfax, VA (US); Kevin Leach, Charlottesville, VA (US); Angelos Stavrou, Fairfax, VA (US); Haining Wang, Fairfax, VA (US)

(*) Notice: Subject to any disclaimer, the term of this patent is extended or adjusted under 35 U.S.C. 154(b) by 0 days.

(21) Appl. No.: 15/173,462

(22) Filed: Jun. 3, 2016

(65) Prior Publication Data
US 2016/0357657 A1 Dec. 8, 2016

Related U.S. Application Data

(60) Provisional application No. 62/170,155, filed on Jun. 3, 2015.

(51) Int. Cl.
  *G06F 11/36* (2006.01)
  *G06F 21/56* (2013.01)
  *H04L 29/06* (2006.01)

(52) U.S. Cl.
  CPC .......... *G06F 11/362* (2013.01); *G06F 21/56* (2013.01); *G06F 21/567* (2013.01); *H04L 63/145* (2013.01); *H04L 67/42* (2013.01); *H04L 63/1425* (2013.01)

(58) Field of Classification Search
  CPC ...... G06F 11/362; G06F 21/56; G06F 21/567; H04L 63/1425; H04L 63/145; H04L 67/42

USPC ......................................................... 717/129
See application file for complete search history.

(56) References Cited

U.S. PATENT DOCUMENTS

| | | | | |
|---|---|---|---|---|
| 5,357,628 A | | 10/1994 | Yuen | |
| 5,745,770 A | * | 4/1998 | Thangadurai | G06F 9/4812 710/260 |
| 5,790,895 A | * | 8/1998 | Krontz | G06F 9/5011 710/240 |
| 5,926,642 A | * | 7/1999 | Favor | G06F 7/74 709/203 |
| 5,978,902 A | * | 11/1999 | Mann | G06F 11/348 712/227 |
| 6,093,213 A | * | 7/2000 | Favor | G06F 7/74 703/25 |
| 6,205,560 B1 | * | 3/2001 | Hervin | G06F 11/2236 712/227 |

(Continued)

OTHER PUBLICATIONS

Oleksiuk, Dmytro, "BUilding reliable SMM backdoor for UEFI based platforms," Jul. 5, 2015, last retrieved from http://blog.cr4.sh/2015/07/building-reliable-smm-backdoor-for-uefi.html on Jul. 24, 2017.*

(Continued)

*Primary Examiner* — Andrew M. Lyons
(74) *Attorney, Agent, or Firm* — Mannava & Kang, P.C.; Vinay Malik

(57) ABSTRACT

Embodiments herein disclose a debugging framework that employs a mode in the processor (for example, a processor using x86 architecture), to transparently study armored malware. Embodiments herein perform stealthy debugging by leveraging System Management Mode (SMM) to transparently debug software on bare-metal.

10 Claims, 5 Drawing Sheets

(56) References Cited

U.S. PATENT DOCUMENTS

| | | | |
|---|---|---|---|
| 6,317,798 B1* | 11/2001 | Graf | G06F 9/451 710/15 |
| 6,453,278 B1* | 9/2002 | Favor | G06F 7/74 703/26 |
| 6,687,744 B1* | 2/2004 | Cromer | G06F 8/60 709/219 |
| 8,353,058 B1* | 1/2013 | McCorkendale | G06F 21/55 380/2 |
| 2004/0103175 A1* | 5/2004 | Rothman | H04L 69/329 709/222 |
| 2005/0229160 A1* | 10/2005 | Rothman | G06F 11/362 717/124 |
| 2007/0011507 A1* | 1/2007 | Rothman | G06F 11/2736 714/718 |
| 2008/0040726 A1* | 2/2008 | Xing | G06F 9/44 719/312 |
| 2012/0144240 A1* | 6/2012 | Rentschler | G06F 11/3636 714/34 |
| 2014/0229942 A1* | 8/2014 | Wiseman | G06F 9/45558 718/1 |
| 2014/0274305 A1* | 9/2014 | Shimabukuro | G07F 17/3241 463/24 |
| 2015/0186322 A1* | 7/2015 | Yao | G06F 21/00 714/42 |
| 2016/0070914 A1* | 3/2016 | Baentsch | H04L 63/145 713/2 |

OTHER PUBLICATIONS

Stallman et al., "Debugging with GDB the GNU Source-Level Debugger," Ninth Edition, Jan. 2002, last retrieved from https://ftp.gnu.org/old-gnu/Manuals/gdb/html_node/gdb_toc.html on Jul. 24, 2017.*

Wikipedia, "Interactive Disassembler," Apr. 21, 2015, last retrieved from https://en.wikipedia.org/w/index.php?title=Interactive_Disassembler&oldid=657863873 on Jul. 24, 2017.*

F. Zhang, "IOCheck: A framework to enhance the security of I/O devices at runtime," 2013 43rd Annual IEEE/IFIP Conference on Dependable Systems and Networks Workshop (DSN-W), Budapest, 2013, pp. 1-4. (Year: 2013).*

F. Zhang, K. Leach, A. Stavrou, H. Wang and K. Sun, "Using Hardware Features for Increased Debugging Transparency," 2015 IEEE Symposium on Security and Privacy, San Jose, CA, 2015, pp. 55-69. (Year: 2015).*

Unknown, "BIOS and Kernel Developer's Guide for AMD Athlon 64 and AMD Opteron Processors",Feb. 2006, 402 Pages, Publication # 26094 Revision: 3.30, http://developer.amd.com/wordpress/media/2012/10/26094.pdf.

Sebastian Vogl et al.,"Using Hardware Performance Events for Instruction-Level Monitoring on the x86 Architecture", Paper in proceedings of the2012 European Workshop on System Security, 2012, 6 Pages, ACM, https://www.sec.in.tum.de/assets/staff/vogl/eurosec_vogl2012.pdf.

Rafal Wojtczuk et al.,"Attacking SMM Memory via Intel® CPU Cache Poisoning", Article, 2009,6 Pages, http://invisiblethingslab.com/resources/misc09/smm_cache_fun.pdf.

Unknown, "flashrom", Webpage, Last retrieved on Jun. 1, 2016, 2 Pages, https://www.flashrom.org/index.php?title=Flashrom&oldid=2196.

Unknown, "ScoopyNG the VMware detection tool", Webpage, 2013 (Last retrieved on Jun. 1, 2016), 2 Pages, Tobias Klein, http://www.trapkit.de/research/vmm/scoopyng/index.html.

Jidong Xiao et al.,"Security Implications of Memory Deduplication in a Virtualized Environment", Paper in proceedings of the 43rd IEEE/ IFIP International Conference on Dependable Systems and Networks, 2013,12 Pages, http://www.cs.wm.edu/~hnw/paper/memdedup.pdf.

Unknown,"Dynamic Instrumentation Tool Plafform",Webpage, Last Retrieved on Jun. 1, 2016, 2 Pages, http://dynamorio.org/.

Al Danial, "Count Lines of Code", Webpage, Last Retrieved on Jun. 1, 2016, 19 Pages, http://cloc.sourceforge.net/.

Unkown,"SuperPI Single-threaded Computer Benchmark", Webpage, Last Retrieved on Jun. 1, 2016, 2 Pages, wPrime Systems, http://www.superpi.net/.

Loic Duflot et al.,"Getting into the SMRAM: SMM Reloaded", Presentation in proceedings of the 12th CanSecWest Conference, 2009, 47 Pages, https://www.researchgate.net/publication/265271795_Getting_into_the_SMRAM_SMM_Reloaded.

Loic Duflot et al.,"System Management Mode Design and Security Issues", Presentation, Feb. 3, 2010, 79 Pages, http://www.ssi.gouv.fr/uploads/IMG/pdf/IT_Defense_2010_final.pdf.

Rafal Wojtczuk et al., "Attacking UEFI Boot Script", Article,Jan. 1, 2015, 2 Pages, https://events.ccc.de/congress/2014/Fahrplan/system/attachments/2566/original/venamis_whitepaper.pdf.

Rafal Wojtczuk et al.,"Attacking Intel BIOS", Presentation, Jul. 30, 2009, 105 Pages,Black Hat USA, Las Vegas, NV, https://www.blackhat.com/presentations/bh-usa-WOJTCZUK/BHUSA09-Wojtczuk-AtkIntelBios-SLIDES.pdf.

John Butterworth et al., "BIOS Chronomancy: Fixing the Core Root of Trust for Measurement", Paper in proceedings of the 20th ACM Conference on Computer and Communications Security, Nov. 4-8, 2013,13 Pages, ACM, https://www.mitre.org/sites/default/files/publications/bios-chronomancy.pdf.

Ahmed M. Azab et al.,"SICE: A Hardware-Level Strongly Isolated Computing Environment for x86 Multi-core Platforms", Paper in proceedings of the 20th ACM conference on Computer and Communications Security, Oct. 17-21, 2011,14 Pages, ACM, Chicago, Illinois, USA, http://www.chenirvine.org/paper/2011_CCS/SICE%20-%20%20A%20Hardware-Level%20Strongly%20Isolated%20Computing%20Environment%20for%20x86%20Multi-core%20Platforms.pdf.

Rafal Wojtczuk et al.,"Attacking Intel® Trusted Execution Technology", Paper, 2009, 6 Pages,http://invisiblethingslab.com/resources/bh09dc/Attacking%20Intel%20TXT%20-%20paper.pdf.

Benjamin Cruz et al., "McAfee Labs Threats Report", Report, Jun. 2014, 27 Pages, McAfee Labs, http://www.mcafee.com/mx/resources/reports/rp-quarterly-threat-q1-2014.pdf.

Costin Raiu et al., "Kaspersky Security Bulletin 2013", 2013, 54 Pages, Kaspersky Lab Global Research and Analysis Team (GREAT), http://media.kaspersky.com/pdf/ksb_2013_en.pdf.

Anand Kashyap et al., "Internet Security Threat Report 2014",Report, Apr. 2014, 98 Pages, vol. 19, Symantec Corporation, http://www.symantec.com/content/en/us/enterprise/other_resources/b-istr_main_report_v19_21291018.en-us.pdf.

Artem Dinaburg et al., "Ether: Malware Analysis via Hardware Virtualization Extensions", Paper presented in the 15th ACM Conference on Computer and Communications Security, Oct. 27-31, 2008,12 Pages, Alexandria, Virginia, USA, https://www.damballa.com/downloads/a_pubs/CCS08.pdf.

Zhui Deng et al., "SPIDER: Stealthy Binary Program Instrumentation and Debugging via Hardware Virtualization", Paper presented in the proceedings of the Annual Computer Security Applications Conference, 2013,12 Pages, West Lafayette, https://www.cerias.purdue.edu/assets/pdf/bibtex_archive/2013-5.pdf.

Aristide Fattori et al.,"Dynamic and Transparent Analysis of Commodity Production Systems", Paper presented in n Proceedings of the IEEE/ACM International Conference on Automated Software Engineering,Sep. 20-24, 2010,10 Pages,Antwerp, Belgium,http://security.di.unimi.it/~joystick/pubs/ase10.pdf.

Lok-Kwong Yan et al., "V2E: Combining Hardware Virtualization and Software Emulation for Transparent and Extensible Malware Analysis", Paper presented in Proceedings of the 8th ACM SIGPLAN/SIGOPS Conference on Virtual Execution Environments, Mar. 3-4, 2012, 11 Pages, London, England, UK, http://www.cl.cam.ac.uk/research/srg/netos/vee_2012/papers/p227.pdf.

Thomas Mandl et al., "ANUBIS ANalyzing Unknown BInarieS the automatic Way", Presentation,Sep. 25, 2009, 32 Pages, Ikarus Security Software, Geneva, https://www.virusbulletin.com/uploads/pdf/conference_slides/2009/Mandl-etal-VB2009.pdf.

(56) References Cited

OTHER PUBLICATIONS

Nguyen Anh Quynh et al., "Virt-ICE: Next-generation Debugger for Malware Analysis", Article, 2010, 8 pages, USA, https://media.blackhat.com/bh-us-10/whitepapers/Anh/BlackHat-USA-2010-Anh-Virt-ICE-wp.pdf.

Xu Chen et al., "Towards an Understanding of Anti-virtualization and Anti-debugging Behavior in Modem Malware", Paper presented in the proceedings of the 38th Annual IEEE International Conference on Dependable Systems and Networks, 2008 , 10 Pages, http://mdbailey.ece.illinois.edu/publications/dsn08_final.pdf.

Rodrigo Rubira Branco et al., "Scientific but Not Academical Overview of Malware Anti-Debugging, Anti Disassembly and Anti-VM Technologies", Paper, 2012, 27 Pages, Qualys—Vulnerability & Malware Research Labs (VMRL), USA, http://research.dissect.pe/docs/blackhat2012-paper.pdf.

Nicolas Falliere., "Windows Anti-Debug Reference", Article,Sep. 11, 2007, 12 Pages, SecurityFocus.com, http://www.symantec.com/connect/articles/windows-anti-debug-reference.

Danny Quist et al., "Detecting the Presence of Virtual Machines Using the Local Data Table", Article, 9 Pages, Offensive Computing, https://repo.palkeo.com/repositories/mirror7.meh.or.id/Todo/vm.pdf.

Elias Bachaalany,"Detect if your program is running inside a Virtual Machine", Article, Apr. 4, 2005, 9 Pages, CodeProject, http://www.codeproject.com/Articles/9823/Detect-if-your-program-is-running-inside-a-Virtual.

Thomas Raffetseder et al., "Detecting System Emulators", Paper, 2007,18 Pages, Springer Berlin Heidelberg, http://www.seclab.tuwien.ac.at/papers/detection.pdf.

Tal Garfinkel et al.,"Compatibility is Not Transparency: VMM Detection Myths and Realities", Paper presented in proceedings of the 11th USENIX workshop on Hot Topics in Operating Systems, 2007, 6 Pages, https://www.usenix.org/legacy/event/hotos07/tech/full_papers/garfinkel/garfinkel.pdf.

Dhilung Kirat et al.,"BareBox: Efficient Malware Analysis on Bare-Metal", Paper presented in Proceedings of the 27th Annual Computer Security Applications Conference, 2011, 10 Pages, Orlando, Florida USA, https://www.cs.ucsb.edu/~chris/research/doc/acsac11_barebox.pdf.

Carsten Willems et al., "Down to the Bare Metal: Using Processor Features for Binary Analysis",Paper presented in Proceedings of the Annual Computer Security Applications Conference,Dec. 3-7, 2012,10 Pages, Orlando, Florida USA, https://www.acsac.org/2012/openconf/modules/request.php?module=oc_program&action=view.php&a=&id=109&type=4.

Unkown, "IDA: About", Webpage, 2 Pages, Last retrieved on May 31, 2016,www.hex-rays.com/products/ida/.

Kostya Kortchinsky, "CLOUDBURST a VMware Guest to Host Escape Story", Presentation, 48 Pages, Jun. 29, 2009, Black Hat, Las Vegas, USA, https://www.blackhat.com/presentations/bh-usa-09/KORTCHINSKY/BHUSA09-Kortchinsky-Cloud burst-SLIDES.pdf.

Rafal Wojtczuk et al,"Subverting the Xen hypervisor", presentation on Aug. 7th,Black Hat USA 2008, Las Vegas, NV, 53 Pages, http://invisiblethingslab.com/resources/bh08/part1.pdf.

Samuel T. King et al., "SubVirt: Implementing malware with virtual machines",Paper presented in proceedings of the 27th IEEE Symposium on Security and Privacy, 2006,14 Pages, IEEE Computer Society, http://web.eecs.umich.edu/virtual/papers/king06.pdf.

Joanna Rutkowska et al., "Bluepilling the Xen Hypervisor", Presentation, Aug. 7, 2008, 85 Pages, Las Vegas, USA, http://invisiblethingslab.com/resources/bh08/part3.pdf.

Unknown, "Intel® 64 and IA-32 Architectures Software Developer's Manual", Apr. 2016, 3947 Pages, Intel corporation, http://www.intel.com/content/dam/www/public/us/en/documents/manuals/64-ia-32-architectures-software-developer-manual-325462.pdf.

Unknown, "Welcome to coreboot", May 7, 2016, 2 Pages, coreboot,https://www.coreboot.org/Welcome_to_coreboot.

Amit Vasudevan et al.,"Stealth Breakpoints", Paper in Proceedings of the 21st Annual Computer Security Applications Conference , 2005, 10 Pages, IEEE Computer Society, https://www.acsac.org/2005/papers/72.pdf.

Dawn Song et al.,"BitBlaze: A New Approach to Computer Security via Binary Analysis", Paper, 2008, 25 Pages, Springer-Verlag, Berlin Heidelberg, http://link.springer.com/chapter/10.1007/978-3-540-89862-7_1#page-1.

Joanna Rutkowska, "Red Pill . . . or how to detect VMM using (almost) one CPU instruction", Article, Retrieved on May 31, 2016, 2 pages, http://repo.hackerzvoice.net/depot_ouah/Red_%20Pill.html.

Gabor Pek et al.,"nEther: In-guest Detection of Out-of-the-guest Malware Analyzers", Paper in proceedings of the 4th European Workshop on System Security, Apr. 10, 2011, 6 Pages , ACM, Salzburg, Austria, https://crysys.hu/publications/files/PekBB11eurosec.pdf.

Dhilung Kirat et al.,"BareCloud: Bare-metal Analysis-based Evasive Malware Detection", Paper in proceedings of the 23rd USENIX Security Symposium, 2014, 15 Pages, https://www.cs.ucsb.edu/~vigna/publications/2014_USENIX_BareCloud.pdf.

Unknown, "OllyDbg", Article, Retrieved on May 31, 2016 , 2 Pages, http://ollydbg.de/.

Derek Bruening et al., "Transparent Dynamic Instrumentation", Paper in proceedings of the 8th ACM SIGPLAN/SIGOPS Conference on Virtual Execution Environments, Mar. 3-4, 2012,11 Pages, London, England, UK, http://www.cl.cam.ac.uk/research/srg/netos/vee_2012/papers/p133.pdf.

Unknown, "WinDbg", Retrieved on May 31, 2016, 6 pages, Microsoft Inc., https://developer.microsoft.com/en-us/windows/hardware/windows-driver-kit.

Unkown, "Open Hub, the open source network", Webpage, Retrieved on May 31, 2016, 3 pages, Black Duck Software, Inc., https://www.openhub.net/.

Joanna Rutkowska, et al.,"Preventing and Detecting Xen Hypervisor Subversions", Presentation, Aug. 7th, 2008,119 Pages, Black Hat, Las Vegas, NV, USA, http://invisiblethingslab.com/resources/bh08/part2-full.pdf.

Fengwei Zhang et al.,"HyperCheck: A Hardware-Assisted Integrity Monitor", Paper , Jul./Aug. 2014, 13 Pages (332-334), vol. 11, No. 4, IEEE Transactions on Dependable and Secure Computing, IEEE, https://cs.gmu.edu/~astavrou/research/hypercheck-tdsc14.pdf.

Ahmed M.Azab et al.,"HyperSentry: Enabling Stealthy In-context Measurement of Hypervisor Integrity", Paper in proceedings of the 17th ACM Conference on Computer and Communications Security, Oct. 4-8, 2010, 12 Pages, ACM, Chicago, Illinois, USA, https://discovery.csc.ncsu.edu/pubs/ccs10.pdf.

Fengwei Zhang et al, "SPECTRE: A Dependable Introspection Framework via System Management Mode", Paper in Proceedings of the 43rd Annual IEEE/IFIP International Conference on Dependable Systems and Networks (DSN), 2013, 12 Pages, https://www.researchgate.net/publication/261211091_SPECTRE_A_dependable_introspection_framework_via_System_Management_Mode.

Jiangwang et al., "Firmware-assisted Memory Acquisition and Analysis Tools for Digital Forensics", Paper in Proceedings of 6th International Workshop on Systematic Approaches to Digital Forensic Engineering (SADFE), 2012 , 5 Pages, https://www.researchgate.net/publication/229037993_Firmware-assisted_Memory_Acquisition_and_Analysis_Tools_for_Digital_Forensics.

Alessandro Reina et al.,"When Hardware Meets Software: A Bulletproof Solution to Forensic Memory Acquisition", Paper in proceedings of the Annual Computer Security Applications Conference, Dec. 3-7, 2012,10 Pages, ACM, Orlando, Florida USA, https://www.acsac.org/2012/openconf/modules/request.php?module=oc_program&action=view.php&a=&id=112&type=4.

Loic Duflot et al.,"Using CPU System Management Mode to Circumvent Operating System Security Functions", Paper in proceedings of the 7th CanSecWest Conference, 2004, 15 Pages, http://www.cs.usfca.edu/~cruse/cs630f06/duflot.pdf.

Shawn Embleton et al., "SMM Rootkits: A New Breed of OS Independent Malware", Paper in proceedings of the 4th International Conference on Security and Privacy in Communication Networks, Sep. 22-25, 2008,12 Pages, ISBN # 978-1-60558-241-2,

(56) References Cited

OTHER PUBLICATIONS

ACM, Istanbul, Turkey, http://www.eecs.ucf.edu/~czou/research/SMM-Rootkits-Securecom08.pdf.

Bsdaemon et al., "System Management Mode Hacks", Article, Last Retrieved on May 31, 2016, 12 Pages, vol. 0x0c, Issue 0x41, Phrack Magazine, http://phrack.org/issues/65/7.html.

Unknown, "NSA's ANT Division Catalog of Exploits for Nearly Every Major Software/Hardware/Firmware", Webpage, Dec. 30, 2013, 52 Pages, LeakSource, https://leaksource.info/2013/12/30/nsas-ant-division-catalog-of-exploits-for-nearly-every-major-software-hardware-firmware/.

Unknown, "TCG PC Client Specific Implementation Specification for Conventional BIOS", TCG PC Specific Implementation Specification, Feb. 24, 2012, 151 Pages (1-151), Version 1.21; Revision 1.00, TCG, https://www.trustedcomputinggroup.org/wp-content/uploads/TCG_PCClientImplementation_1-21_1_00.pdf.

Fengwei Zhang et al., "A Framework to Secure Peripherals at Runtime", Paper in proceedings of the 19th European Symposium Research in Computer Security, 2012, 20 Pages, ESORICS, http://mason.gmu.edu/~fzhang4/paper/iocheck-esorics14.pdf.

Bhushan Jain et al.,"SoK: Introspections on Trust and the Semantic Gap", Paper in proceedings of the 35th IEEE Symposium on Security and Privacy, 2014, 16 Pages, http://www.ieee-security.org/TC/SP2014/papersSoK_c_IntrospectionsonTrustandtheSemanticGap.pdf.

Tal Garfinkel et al., "A Virtual Machine Introspection Based Architecture for Intrusion Detection", Paper in proceedings of the 10th Annual Network and Distributed Systems Security Symposium, 2003, 16 Pages, http://suif.stanford.edu/papers/vmi-ndss03.pdf.

Xuxian Jiang et al., "Stealthy Malware Detection Through VMM-Based "Out-of-the-Box" Semantic View Reconstruction", Paper in proceedings of the 14th ACM Conference on Computer and Communications Security, Oct. 29-Nov. 2, 2007, 11 Pages, ACM, Alexandria, Virginia, USA, https://cs.gmu.edu/~xwangc/Publications/CCS07-VMwatcher.pdf.

Via Technologies, Inc., "VT8237R Data Sheet", Dec. 15, 2004, 181 Pages, Revision 2.06, VIA Technologies Incorporated, USA, http://www.yuiop.co.uk/epia/stuff/South%20%20Bridge/Data%20Sheet%20VT8237R%20South%20Bridge%20(Revision%202.06)(Lead-Free).pdf.

\* cited by examiner

METHODS AND SYSTEMS FOR INCREASED DEBUGGING TRANSPARENCY

CROSS REFERENCE TO RELATED APPLICATIONS

This application is based on and derives the benefit of U.S. Provisional Application 62/170,155, filed on Jun. 3, 2015, the contents of which are incorporated herein by reference.

This invention was made with government support under Grant Numbers CNS 1421747 and II-NEW 1205453 awarded by the National Science Foundation; and Contract Number FA8650-11-C-7190, and ONR Grant N00014-13-1-0088 awarded by the Defense Advanced Research Projects Agency. The government has certain rights in the invention.

TECHNICAL FIELD

The present disclosure relates to providing security for electronic devices, and, more particularly, to providing security for electronic devices by using the processor of the electronic device for detecting malware.

SUMMARY

In an example embodiment, a method for analyzing code has been disclosed herein, the method comprising triggering a SMI (System Management Interrupt) by a server, on receiving a triggering message from a client; entering a System Management Mode (SMM) by the server, on receiving at least one debugging command from the client; executing debugging commands on a target application by the server in SMM, wherein the server receives the debugging commands from the client; and sending a response message by the server to the client.

In an example embodiment, a system for analyzing code has been disclosed, the system comprising of a server and at least one client, the system being configured to trigger a SMI (System Management Interrupt) by the server, on receiving a triggering message from the client; the system is also configured to enter a System Management Mode (SMM) by the server, on receiving at least one debugging command from the client; the system is also configured to execute debugging commands on the target application by the server in SMM, wherein the server receives the debugging commands from the client; the system is also configured to send a response message by the server to the client.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE FIGURES

The embodiments herein will be better understood from the following detailed description with reference to the drawings, in which.

DETAILED DESCRIPTION OF EMBODIMENTS

Figure 1:
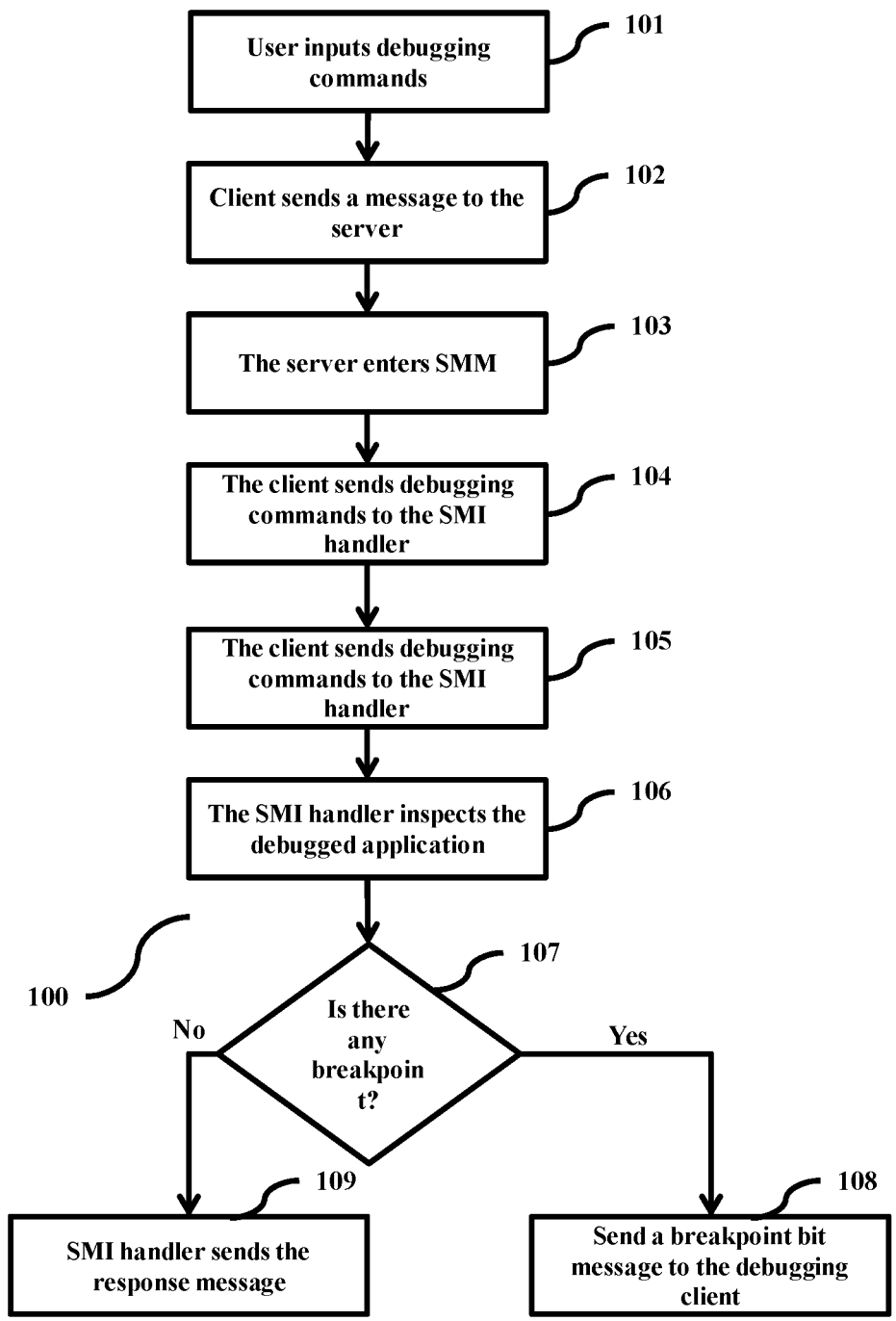
FIG. 1 is a flowchart depicting the process of analyzing code of an application present on a client by a debugging server, according to example embodiments as disclosed herein.

The example embodiments herein and the various features thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description used herein is intended merely to facilitate an understanding of ways in which the example embodiments herein may be practiced and to further enable those of skill in the art to practice the embodiments herein. Accordingly, this disclosure should not be construed as limiting the scope of the example embodiments herein.

This disclosure describes a debugging framework that employs a mode in the processor (for example, a processor using x86 architecture), to transparently study armored malware. Embodiments herein perform stealthy debugging by leveraging System Management Mode (SMM) to transparently debug software on bare-metal. A feature of SMM is to provide a distinct and easily isolated processor environment that is transparent to the OS or running applications. Embodiments herein comprise of debugging functions, including register/memory accesses and breakpoints and use hardware performance monitoring counters. Embodiments herein also include an interface to allow working with debugging clients, such as IDAPro (Interactive Disassembler), and GDB (GNU Project Debugger).

Embodiments herein run potential malware code to be debugged on a first physical target machine and employ SMI handler to communicate with the debugging client on a second physical machine. Embodiments herein run debugging code in SMM without using a hypervisor. Thus, it has a smaller Trusted Code Base (TCB) than hypervisor-based debugging systems, which significantly reduces the attack surface and enables the detection of the debugging environment by the malware. SMM is a mode of execution similar to real and protected modes. The SMM provides a transparent mechanism for implementing platform-specific system control functions such as power management. The Basic Input/Output System (BIOS) can initialize the SMM. The BIOS can initialize hardware and loads the operating system. The BIOS code can be stored on non-volatile memory on the motherboard of the device. The BIOS can perform some hardware initialization and then execute a payload (for example, UEFI (Unified Extensible Firmware Interface)). The BIOS can be written in a generic programming language such as C and allows edits of the SMI handler. This makes the embodiments herein much more portable as the BIOS abstracts away the heterogeneity of specific hardware configurations.

In an embodiment, SMM is triggered by asserting the System Management Interrupt (SMI) pin on the CPU. This pin can be asserted in a variety of ways, which includes, for example, writing to a hardware port or generating Message Signaled Interrupts with a PCI device. Next, the CPU saves its state to a special region of memory called System Management RAM (RAM). Then, the CPU executes the SMI handler stored in RAM. The requests for addresses in RAM can be forwarded to a suitable memory by default (such as a video memory) or even transmitted to the server that triggered the SMM. This allows the RAM to be used as secure storage. The SMI handler is loaded into the RAM by the BIOS at boot time. The SMI handler has unrestricted access to she physical address space and can run any instructions requiring any privilege level. The RSM instruction forces the CPU to exit from the SMM and resume execution in the previous mode. While SMM executes, protected mode is essentially paused, with the other modules of the devices (such as the Operating System (OS), hypervisor, or any other code running below the BIOS) unaware of code executing in SMM. The debugging client can communicate with a target server using a protocol with serial messages (such as GDB). Embodiments herein implement basic debugging commands (for example, breakpoints, memory/register examination). Furthermore, embodiments herein implement the following techniques to provide step-by-step debugging: instruction-level, branch-level, far control transfer level, and near return transfer level.

Embodiments herein consider transparent analysis of malware, transparent analysis of virtualization, emulation, SMM and debuggers. The transparency of virtualization is difficult to achieve. In an example, Red Pill uses an unprivileged instruction SIDT to read the interrupt descriptor (IDT) register to determine the presence of a virtual machine. To work on multi-processor system, Red Pill needs to use SetThreadAffinityMask ( ) Windows API call to limit thread execution to one processor. Another solution detects hardware virtualization using CPU design defects. Furthermore, there are many footprints introduced by virtualization such as well-known strings in memory, magic I/O ports, and invalid instruction behaviors.

Some techniques use emulation to debug malware. For example, QEMU simulates all the hardware devices including CPU, and malware runs on top of the emulated software. Because of the emulated environment, malware can detect the debugging software. For example, accessing a reserved or unimplemented MSR register causes a general protection exception, while QEMU does not raise an exception.

SMM is a hardware feature that is present on x86 CPUs. There are implementations of SMM by microprocessor manufacturers with similar properties including Intel and AMD. Regarding its transparency, the following mechanisms make SMM transparent to the application programs and operating systems: (1) the only way to enter SMM is by means of an SMI; (2) the processor executes SMM code in a separate address space (RAM) that is inaccessible from the other operating modes; (3) upon entering SMM, the processor saves the context of the interrupted program or task; (4) all interrupts normally handled by the operating system are disabled upon entry into SMM; and (5) the RSM instruction can be executed only in SMM.

An array of debuggers have been proposed for transparent debugging. As to the transparency, embodiments herein only consider the artifacts introduced by debuggers and hypervisors, not the environments (e.g. the SMM). A plurality of formal requirements have been proposed for achieving transparency, including (1) high privilege, (2) no non-privileged side effects, (3) identical basic instruction execution semantics, (4) transparent exception handling, and (5) identical measurement of time. Embodiments herein satisfy the first requirement by running the analysis code in SMM with ring −2. There are no side effects created by embodiments of the present disclosure that can be detected by the device or code running on the device without interaction to an external source providing precise timing information. Since embodiments herein run on bare metal, it immediately meets the third and fourth requirements. Lastly, embodiments herein partially satisfy the fifth requirement by adjusting the local timers in the SMI handler.

FIG. 1 is a flowchart depicting the process of analyzing code of an application present on a client by a debugging server. The client can be an electronic device such as a computer, laptop, mobile phone, smart phone, tablet, wearable computing device, or any other device comprising of a processor architecture with SMM. The client can be in communication with a server, wherein the server performs debugging.

The client sends an SMI triggering message to the server. On receiving the SMI triggering message from the client, the server can generate a SMI.

In step 101, the user inputs debugging commands (for example, list registers) on the client. The user can use a suitable means such as a keyboard, a touchscreen, or any other equivalent means to input the debugging commands. In step 102, the client sends a message comprising the inputted debugging commands to the server. The message can comprise of the code to be debugged, or a means to access the code to be debugged (such as a link, requisite permissions to access and execute commands on the code resident on the client). In step 103, the server enters SMM, on receiving the message from the client. In step 104, the client starts to send debugging commands to the SMI handler on the server. In step 105, the SMI handler transparently executes the received commands (for example, list registers, set breakpoints). At step 106, the SMI handler inspects the debugged application at runtime and at step 107, if the SMI handler hits a breakpoint on the application, the SMI handler sends a breakpoint bit message to the debugging client (step 108) and stays in SMM until further debugging commands are received. In step 109, the SMI handler sends a response message containing the information requested by the command. Since, the server executes the actual debugging command within the SMI handler, its operation remains transparent to the target application and underlying operating system. Once SMM has control of the system, the next SMI can be configured via performance counters on the CPU. The various actions in method 100 may be performed in the order presented, in a different order or simultaneously. Further, in some embodiments, some actions listed in FIG. 1 may be omitted.

Figure 2:
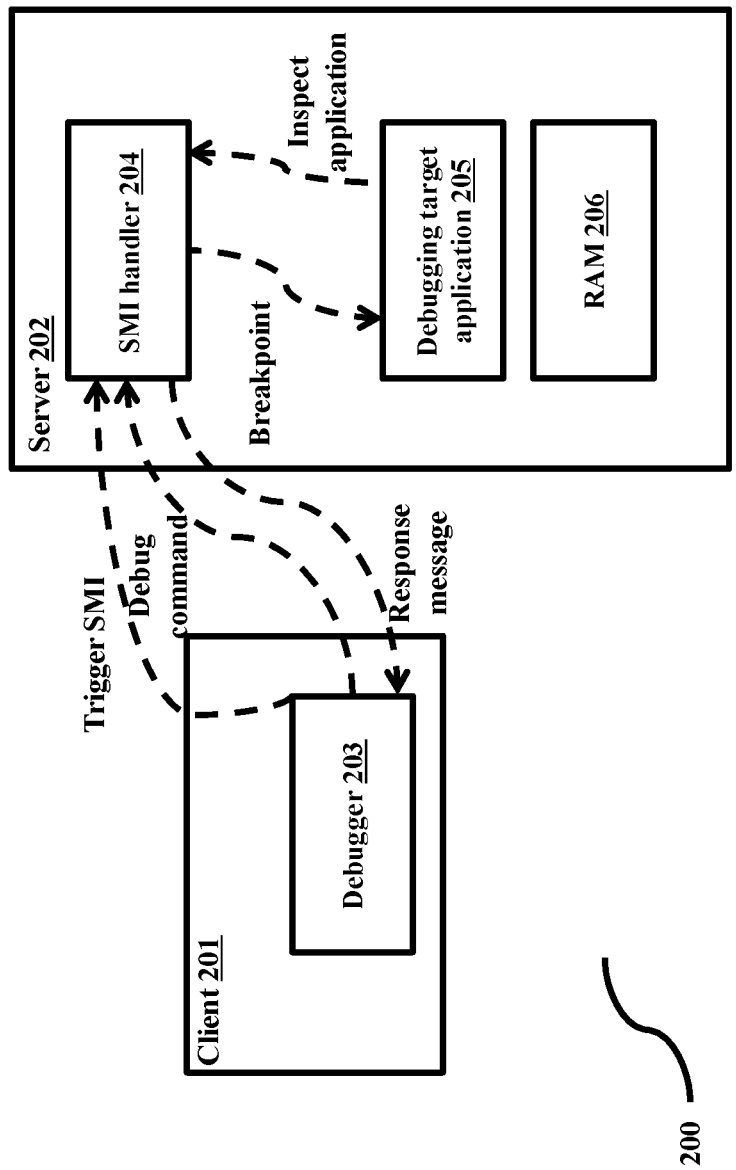
FIG. 2 depicts a client device connected to the server, wherein the server can debug an application present on the client, according to example embodiments as disclosed herein.

FIG. 2 depicts a client device connected to the server, wherein the server can debug an application present on the client. The client 201 comprises of at least one debugger 203. The debugger 203 can implement a protocol such as GDB, IDAPro, to interface with the client 201 and/or the server 202.

The client 201 comprises of a command line application. A user can direct the debugger 203 to perform tasks, such as setting breakpoints. For example, the user writes commands such as b 0xdeadbeef to set a breakpoint at address 0xdeadbeef. The specific commands are described in Table 1.

TABLE 1

| Message Format | Description |
| --- | --- |
| R | A single byte, R is sent to request that all registers be read. This includes all the processor registers. The order in which they are transmitted corresponds with the trap frame. The response is a byte, r, followed by the registers $r_1, r_2, r_3, r_4, \ldots r_n$. |
| mAAAALLLL | The byte m is sent to request a particular memory address for a given length. The address, A, is a 32-bit little-endian virtual address indicating the address to be read. The value L represents the number of bytes to be read. |
| Wr1r2r3 ... m | The byte W is sent to request that the SMI handler write all of the registers. Each value ri contains the value of a particular register. The response byte, + is sent to indicate that it has finished. |
| SAAAALLLLV ... | The command, S, is sent when the debugger wants to write a particular address. A is the 32-bit, little-endian virtual address to write, L represents the length of the data to be written, and V is the memory to be written, byte-by-byte. The response is a byte: +, indicating that the operation has finished, or − if the operation has failed. |
| BAAAA | The B command indicates a new breakpoint at the 32-bit little-endian virtual address A. The response is −r if successful, or −− if it fails (for example, trying to break at an already-broken address). If the SMI handler is triggered by a breakpoint (for example, the program is in breakpoint debugging status), it will send a status packet with the single character, B, to indicate that the program has reached a breakpoint and is ready for further debugging. The SMI handler will wait for commands from the client until the continue command is received, whereupon it will exit from SMM. |
| C | The C command continues execution after a breakpoint. The SMI handler will send a packet with single character, +. |
| X | The X command clears all breakpoints and indicates the start of a new debugging session. |
| KAAAA | The K command removes the specified break point if it was set previously. The 4-byte value A specifies the virtual address of the requested breakpoint. It responds with a single + byte if the breakpoint is removed successfully. If the breakpoint does not exist, it responds with, a single −. |
| SI, SB, SF, SN | The SI command indicates stepping the system instruction by instruction. The SB command indicates stepping the system by taken branches. The SF command indicates stepping the system by control transfers including far call/jmp/ret. The SN command indicates stepping the system by near return instructions. The SMI handler replies with single character, +. |

The client 201 can use a suitable messaging format such as serial messages to communicate with the server 202. The commands in Table 1 cover the basic debugging operations upon which the client can expand.

The server 202 comprises of the SMI handler 204, the debugging target application 205 (which can be a potential malware/rootkit), and a RAM 206. The SMI handler 204 implements the critical debugging features (for example, breakpoints, state reports), thus restricting the execution of debugging code to SMM. The debugging target application 205 executes in protected mode. The CPU state is saved within the RAM 206 when switching to SMM, so embodiments herein can reconstruct useful information and perform typical debugging operations each time an SMI is triggered. The RAM 206 can be an isolated memory region (RAM) from normal memory in Protected Mode. The RAM 206 comprises architectural state information of the thread that was running when the SMI was triggered. Since the SMIs are produced regardless of the running thread, the RAM 206 can contain a state unrelated to the debugging target. After recognizing the SMI assertion, the processor can save almost the entirety of its state to the RAM 206. Any access to this memory in other CPU modes will be redirected to VGA memory.

The SMM cannot understand the semantics of raw memory. The CPU state saved by SMM only belongs to the thread that was running when the SMI was triggered. If step-by-step execution is used, there is a chance that another application is executing when the SMI occurs. Thus, the target application must be identified, so that there is no interference with the execution of unrelated applications. This requires reconstructing OS semantics.

Figure 3:
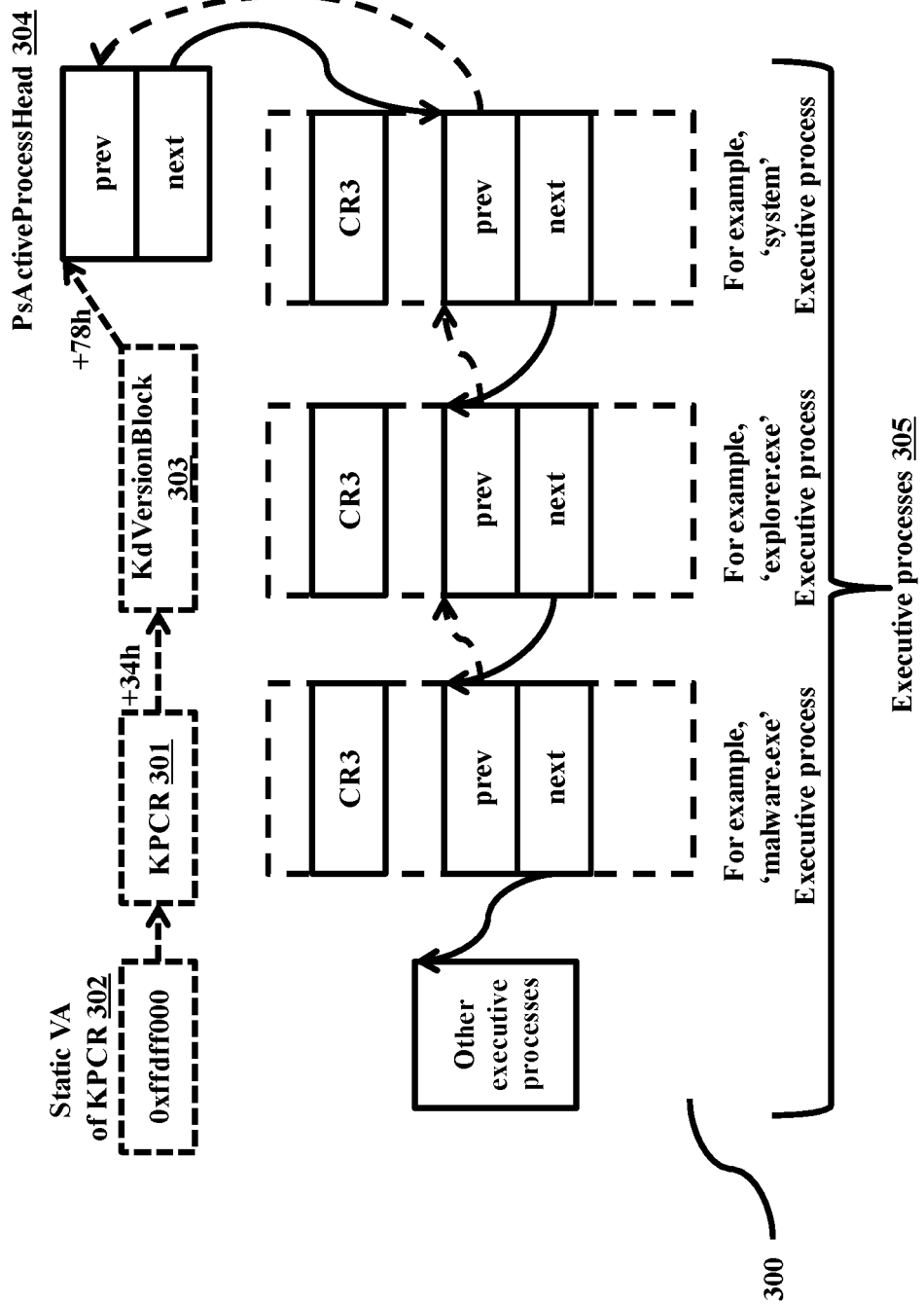
FIG. 3 is an example process descriptor containing critical information for bridging the semantic gap in Windows NT kernels, according to example embodiments as disclosed herein.
Figure 4:
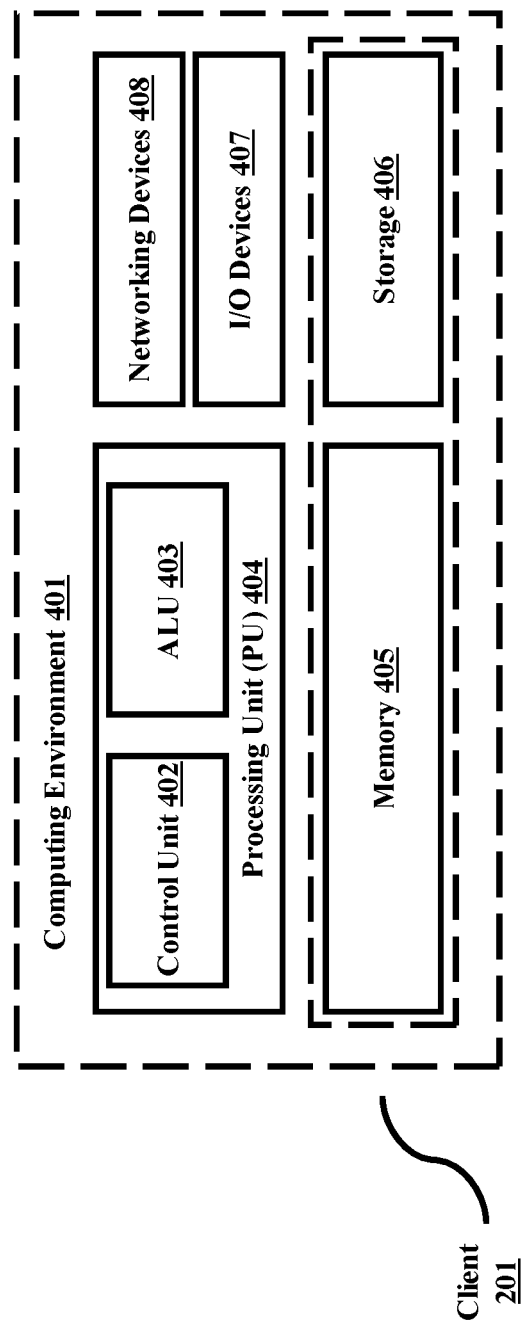
FIG. 4 illustrates a computing environment implementing the method for enabling a user to input commands, according to embodiments as disclosed herein.

Considering the example of Windows (as depicted in FIG. 3), consider the Kernel Processor Control Region (KPCR) structure 301 associated with the CPU, which has a static linear address, 0xffdff000 302. At offset 0x34 of KPCR, there is a pointer to a structure called KdVersionBlock 303, which contains a pointer to PsActiveProcessHead 304. The PsActiveProcessHead serves as the head of a doubly and circularly linked list of Executive Process (EProcess) structures. The EProcess structure is a process descriptor containing critical information for bridging the semantic gap in Windows NT kernels. In particular, the Executive Processes 305 contains the value of the CR3 register associated with the process. The value of the CR3 register contains the physical address of the base of the page table of that process. The name field in the EProcess or task_struct is used to identify the CR3 value of the target application when it executes first instruction. Since the malware may change the name field, the saved CR3 is compared with the current CR3 to identify the target process for further debugging. Alternatively, the ETP value is compared with the target application's entry point.

Filling the semantic gap in Linux is a similar procedure. Any suitable method can be used to debug applications on the Linux platform, such as described in F. Zhang, K. Leach. E. Sun, and A. Stavrou, "SPECTRE: A Dependable Introspection Framework via System Management Mode," in Proceedings of the 43rd Annual IEEE/IFJ.P International Conference on Dependable Systems and Networks (DSN'13), 2013; and X. Jiang, X. Wang, and D. Xu, "Stealthy Malware Detection Through VMM-based Out-of-the-box Semantic View Reconstruction," in Proceedings of the 14th ACM Conference on Computer and Communications Security (CCS'07), 2007.

By bridging the semantic gap within the SMI handler, the state of the thread executing in protected mode can be ascertained. The analysis in the SMI handler is continued only if the RAM state belongs to a thread that needs to be debugging. Otherwise, the SMI handler can be exited. Note that embodiments herein do not require Protected Mode;

SMM can be initialized from any other mode (for example, Real Mode), but the semantics of the code would be different.

A target machine comprises of a device with a custom BIOS. The SMI handler in the BIOS code has been modified to implement a debugging server. This custom SMI handler is responsible for all typical debugging functions found in other debuggers 203. Remote debugging functions can be implemented to achieve common debugging functions such as breakpoints, step-by-step execution, state inspection and mutation.

The client 201 sends an SMI triggering message to the server 202. On receiving the SMI triggering message from the client, the server 202 can trigger the SMI. The server 202 can trigger the SMI by rerouting a serial interrupt. Embodiments herein require the CPU to stealthily enter SMM. An SMI can be asserted via software or hardware. Embodiments herein change the redirection table entry back to its original value to remove this footprint in the first generated SMI handler. Once SMM has control of the system, the SMIs are triggered by configuring performance counters.

In an embodiment herein, the software method writes to an Advanced Configuration and Power Interface (ACPI) port to trigger an SMI, and this method can be used to implement software breakpoints. An out instruction can be placed in the malware code so that when the application's control flow reaches that point, SMM begins execution, and the application can be analyzed. The assembly instructions are:
mov $0x52f, % dx;
out % ax, (% dx);

The first instruction moves the SMI software interrupt port number into the dx register, and the second instruction writes the contents stored in ax to that SMI software interrupt port. In total, these two instructions take six bytes: 66 BA 2F 05 66 EE. While this method is straightforward, it is similar to traditional debuggers using XNT3 instructions to insert arbitrary breakpoints.

Embodiments herein can use hardware-based methods to trigger SMTs. A first method uses a serial port to trigger an SMI to start a debugging session. In order for the client 201 to interact with the server 202 and start a session, a serial interrupt is rerouted to generate an SMI by configuring the redirection table in VO Advanced Programmable Interrupt Controller (APIC). The serial port COM on the server 202 can be used, and its Interrupt Request (IRQ) number is 4. The redirection table entry of IRQ 4 is configured at offset 0x18 in I/O APIC and the Delivery Mode (DM) is changed to SMI. Therefore, an SMI is generated when a serial message arrives. The client 201 sends a triggering message, causing the target machine to enter SMM. Once in SMM, the client 201 sends further debugging commands to which the target responds. Embodiments herein use this method to trigger the first SMI and start a debugging session on the server 202. The time of triggering the first SMI is right before each debugging session after reboot, because it is assumed that the first instruction of malware can compromise the system.

A second hardware-based method uses performance counters to trigger an SMI. This method leverages two architectural components of the CPU: performance monitoring counters and Local Advanced Programmable Interrupt Controller (LAPIC). First, the Performance Counter Event Selection (PerfEvtSel0) register is configured to select the counting event. There is an array of events from which to select; and different events are used to implement various debugging functionalities. For example, the Retired Instructions Event (COh) is used to single-step the whole system.

Next, the corresponding performance counter (PerfCtr0) register is set to the maximum value. In this case, if the selected event happens, it overflows the performance counter. Lastly, the Local Vector Table Entry (LVTE) in LAPIC is configured to deliver SMTs when an overflow occurs. LAPIC registers in the CPU are memory-mapped, and its base address is normally at 0xFEE00000. Embodiments herein relocate LAPIC registers to another physical address by modifying the value in the 24-bit base address field of tire IA32_APIC_BASE Model Specific Register (MSR). The guest VM is also switched to the hypervisor VMX root mode.

The user can input debugging commands (for example, list registers). The user can use a suitable means such as a keyboard, a touchscreen, or any other equivalent means to input the debugging commands. The client 201 sends the message comprising the inputted debugging commands to the server 202. The message can comprise of the code to be debugged, or a means to access the code to be debugged (such as a link, requisite permissions to access and execute commands on the code resident on the client). The server 202 enters SMM, on receiving the message from the client 201. The client 201 starts to send debugging commands to the SMI handler 204 on the server 202. The SMI handler 204 transparently executes the received commands (for example, list registers, set breakpoints).

Using different performance counters breaks the execution of a program. For instance, by monitoring the Retired Instruction event, instruction-level stepping can be achieved in the system. Table 2 summarizes the performance counters used herein.

TABLE 2

| Performance counter events | Description |
| --- | --- |
| Retired instruction | Counts retired instruction, plus executions and interrupts (each count as one instruction) |
| Retired taken branches | Includes all types of architectural control flow changes, including exceptions and interrupts |
| Retired far control transfers | Includes far calls/jumps/returns, IRET, SYSCALL and SYSRET, exception and interrupts |
| Retired near returns | Counts near return instruction (RET or RET Iw) retired |

First, the event is assigned to the PerfEvtSel0 register to indicate that the event of interest will be monitored. Next, the value of the counter is set to the maximum value (i.e., a 48-bit register is assigned $2^{48}-2$). Thus, the next event to increase the value will cause an overflow, triggering an SMI. Note that the −2 term is used because the Retired Instruction event also counts interrupts. In this case, the SMI itself will cause the counter to increase as well. The system becomes deadlocked if the value is not chosen correctly.

Embodiments herein leverage SMM and do not employ virtualization, which provides a more transparent execution environment. In addition, embodiments herein do not incur a time gap between the occurrence of a performance event and the NMI delivery. Note that the SMI has priority over an NMI and a maskable interrupt as well. Embodiments herein can use stepping methods such as instruction-by-instruction stepping, and retired near returns event. Instruction-by-instruction stepping achieves fine-grained tracing. Using the Retired Near Returns event causes low system overhead, while providing coarse-gained debugging.

The SMI handler 204 inspects the debugged application at runtime and at step 106, if the SMI handler 204 hits a breakpoint on the application, the SMI handler 204 sends a breakpoint bit message to the client 201 and stays in SMM until further debugging commands are received.

Breakpoints are generally software or hardware based. Software breakpoints allow for unlimited breakpoints, but they must modify a program's code, typically placing a single interrupt or trap instruction at the breakpoint. Self-checking malware can easily detect or interfere with such changes. On the other hand, hardware breakpoints do not modify code, but there can only be a limited number of hardware breakpoints as restricted by the CPU hardware.

Embodiments herein emulate the behavior of software breakpoints by modifying the target's code to trigger SMIs. An SMI is triggered by writing a value to the hardware port, 0x52f. In total, this takes six bytes. Six bytes are thus saved from the requested breakpoint address and replaced with the SMI triggering code. Thus, when execution reaches this point, the CPU enters SMM. The breakpoint is stored in the RAM 206, represented as 4 bytes for the address, 6 bytes for the original instruction, and one byte for a validity flag. Thus, each breakpoint occupies 11 bytes in the RAM 206. When the application's control reaches the breakpoint, it generates an SMI. In the SMI handler, the saved binary code is written back to the application text and the Extended Instruction Pointer (EIP) register is reverted so that it will resume execution at that same instruction. Then, the SMI handler waits until the client sends a continue command. In order to remove an inserted breakpoint, the client can send a remove-breakpoint command and the SMI handler will disable that breakpoint by setting the enable flag to 0.

Embodiments herein implement a new hardware breakpoint technique. It relies on performance counters to generate SMIs. Essentially, the EIP of the currently executing instruction is compared with the stored breakpoint address during each cycle. 4 bytes are used to store the breakpoint address and 1 byte for a validity flag. We do not need to store instructions because there is no change in the application memory. Thus, only 5 bytes are needed to store such hardware breakpoints. For each Protected Mode instruction, the SMI handler 204 checks if the target application is the running thread when the SMI is triggered; checks if the current EIP equals a stored breakpoint address; start to count retired instructions in the performance counter, and set the corresponding performance counter to the maximum value; and configure LAPIC so that the performance counter overflow generates an SMI.

Breakpoint addresses are stored in the RAM 206, and thus the number of active breakpoints is limited by the size of the RAM 206. Embodiments herein reserve a 512-byte region, from SMM_BASE+0xFC00 to SMM_BASE+0xFE00. Since each hardware breakpoint takes 5 bytes, 102 breakpoints can be stored in this region. If necessary, the total region of the RAM 206 can be expanded by taking advantage of a region called TSeg, which is configurable via the SMM_MASK register.

The SMI handler 204 sends a response message containing the information requested by the command. Since, the server 202 executes the actual debugging command within the SMI handler, its operation remains transparent to the target application and underlying operating system. Once SMM has control of the system, the next SMI can be configured via performance counters on the CPU.

Performance monitoring registers are also MSRs. RDMSR, RDPMC, and WRMSR are the only instructions that can access the performance counters or MSRs. To mitigate the footprints of these MSRs, embodiments herein run in instruction-by-instruction mode and adjust the return values seen by these instructions before resuming Protected Mode. If a WRMSR to modify the performance counters is found, the client 201 will be notified.

The server 202 can flash the BIOS with the original image before the debugging process, and it takes about 28 seconds to flash the BIOS with the original BIOS. At that time, the SMI handler, including the debugging code, has been loaded into RAM and locked. Note that it is needed to reflash the BIOS for the next system restart.

There are many timers and counters on the motherboard and chipsets, such as the Real Time Clock (RTC), the Programmable Interval Timer (8253/8254 chip), the High Precision Event Timer (HPET), the ACPI Power Management Timer, the APIC Timer, and the Time Stamp Counter (TSC). Malware can read a timer and calculate its running time. If the time exceeds a certain threshold, malware can conclude that a debugger is present. For the configurable timers, embodiments herein record their values after switching into SMM. When SMM exits, the values are set back using the recorded values minus the SMM switching time. Thus, malware is unaware of the time spent in the SMI handler.

However, some of the timers and counters cannot be changed, even in SMM. To address this problem, embodiments herein adjust the return values of these timers in the instruction-level stepping mode. For example, the RDTSC instruction reads the TSC register and writes the value to the EAX and EDX registers. While debugging, it is checked if the current instruction is RDTSC and adjust the values of EAX and EDX before leaving the SMI handler.

Embodiments herein can intercept the instruction that reaches out for timing information and prepare a fake time for the OS.

Figure 5:
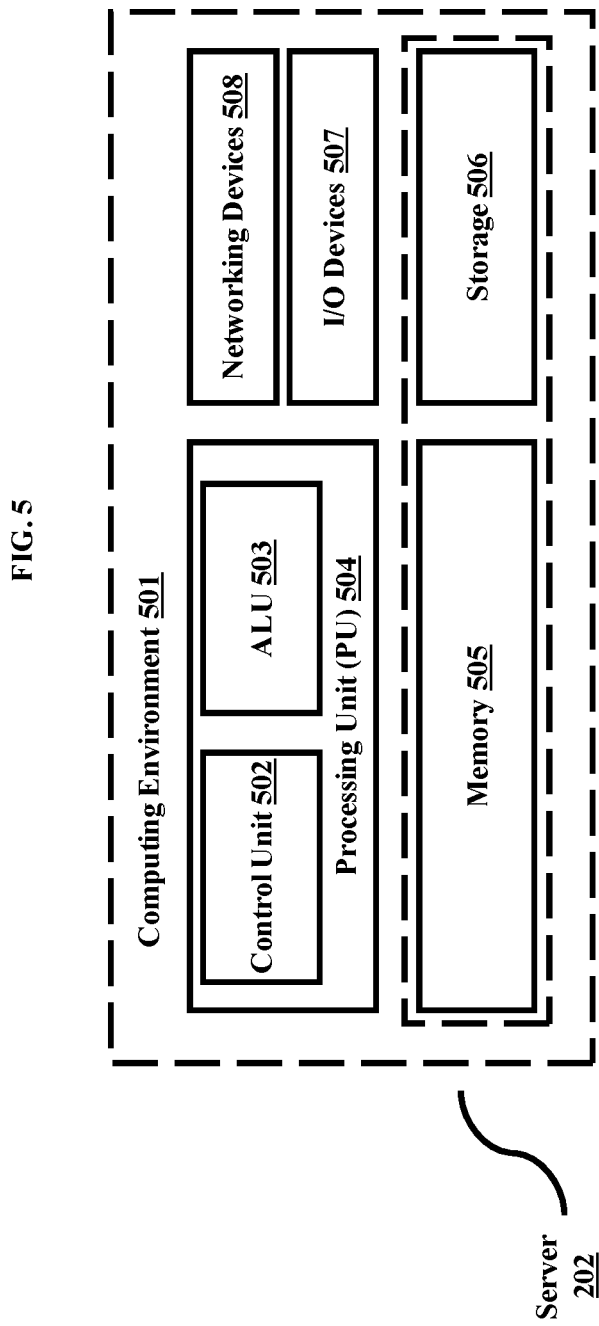
FIG. 5 illustrates a computing environment implementing the method for debugging application code, according to example embodiments as disclosed herein.

FIG. 5 illustrates a computing environment implementing the method for enabling a user to input commands. As depicted, the computing environment 401 comprises at least one processing unit 404 that is equipped with a control unit 402 and an Arithmetic Logic Unit (ALU) 403, a memory 405, a storage unit 406, plurality of networking devices 408 and at least one Input output (I/O) device 407. The processing unit 404 is responsible for processing the instructions of the algorithm. The processing unit 404 receives commands from the control unit in order to perform its processing. Further, any logical and arithmetic operations involved in the execution of the instructions are computed with the help of the ALU 403.

The overall computing environment 401 can be composed of multiple homogeneous and/or heterogeneous cores, multiple CPUs of different kinds, special media and other accelerators. The processing unit 404 is responsible for processing the instructions of the algorithm. Further, the plurality of processing units 404 may be located on a single chip or over multiple chips.

The algorithm comprising of instructions and codes required for the implementation are stored in either the memory unit 405 or the storage 406 or both. At the time of execution, the instructions may be fetched from the corresponding memory 405 and/or storage 406, and executed by the processing unit 404.

In case of any hardware implementations various networking devices 408 or I/O devices 407 may be connected to the computing environment to support the implementation through the networking unit and the I/O device unit. The processing unit 404 can use a suitable messaging format such as serial messages to communicate with the server 202, using the I/O device 407. The processing unit 404 can send an SMI triggering message to the server 202. The processing unit 404 can enable the user to provide debugging commands, which are sent to the server 202.

FIG. 5 illustrates a computing environment implementing the method for debugging application code. As depicted, the computing environment 501 comprises at least one processing unit 504 that is equipped with a control unit 502 and an Arithmetic Logic Unit (ALU) 503, a memory 505, a storage unit 506, plurality of networking devices 508 and at least one Input output (I/O) device 507. The processing unit 504 is responsible for processing the instructions of the algorithm. The processing unit 504 receives commands from the control unit in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of the algorithm. Further, the plurality of processing units 504 may be located on a single chip or over multiple chips.

The algorithm comprising of instructions and codes required for the implementation are stored in either the memory unit 505 or the storage 506 or both. At the time of execution, the instructions may be fetched from the corresponding memory 505 and/or storage 506, and executed by the processing unit 504.

In case of any hardware implementations various networking devices 508 or external I/O devices 507 may be connected to the computing environment to support the implementation through the networking unit and the I/O device unit.

The processor 504 can generate a SMI, on receiving the SMI triggering message from the client. The processor 504 can enter SMM, on receiving the message from the client. The processor 504 can transparently execute the received commands (for example, list registers, set breakpoints). The processor 504 can inspect the debugged application at runtime and if the processor 504 can hit a breakpoint on the application, the processor 504 can send a breakpoint bit message to the debugging client and stay in SMM until further debugging commands are received. The processor 504 can send the response message containing the information requested by the command.

Packing is used to obfuscate the binary code of a program. It is typically used to protect the executable from reverse engineering. Nowadays, malware writers also use packing tools to obfuscate their malware. Packed malware is more difficult for security researchers to reverse-engineer tire binary code. In addition, many packers contain anti-debugging and anti-VM features, further increasing the challenge of reverse engineering packed malware. To demonstrate the transparency of embodiments disclosed herein, in an example, consider that the Notepad.exe application is packed in a Windows environment and this packed application is debugged with using a plurality of methods. After running the packed Notepad.exe, if the Notepad window appears, it can be known that it has launched successfully. Table 3 lists the results.

TABLE 3

| Packing tool | Disclosed embodiments | GliyDbg V1.10 | Dynamo RIO V4.2.0-3 | VMware Fusion V6.0.2 |
|---|---|---|---|---|
| UPX V3.08 | OK | OK | OK | OK |
| Obsidium VI.4 | OK | Access violation at 0x00000000 | Segmentation fault | OK |
| ASPack V2.29 | OK | OK | OK | OK |
| Armadillo V2.01 | OK | Access violation at 0x42434847 | Crash | Crash |
| Themida V2.2.3.0 | OK | Privileged instruction exception | Exception at 0xl0a65d7 | Message; cannot run under a VM |
| RLPack VI.21 | OK | OK | OK | OK |
| PELock V1.0694 | OK | Display message and terminate | Segmentation fault | OK |
| VMProtect V2.13.5 | OK | Message; a debugger was found | OK | Crash |
| eXPressor VI.8.0.1 | OK | Message: unknown executable format | Segmentation fault | Crash |
| PECompact V3.02.2 | OK | Access violation at 0x00000000 | OK | OK |

All the packing tools except UPX, ASPack, and RLPack can detect OllyDbg. Obsidium, Armadillo, Themida, PELock, and eXPressor are able to detect DynamoRIO, and the VM can be detected by Armadillo, Themida, VMProtect, and eXpressor. In contrast, embodiments herein remain transparent to all these packing tools as expected.

Embodiments herein have been on two example physical machines. The target server used an ASUS M2V-MX_.SE motherboard with an AMD K8 northbridge and a VIA VT8237r southbridge. It has a 2.2 GHz AMD LE-1250 CPU and 2 GB Kingston DDR2 RAM. The target machine uses Windows XP 8P.3, CentOS 5.5 with kernel 2.6.24, and Xen 3.1.2 with CentOS 5.5 as domain 0. To simplify the installation, they are installed on three separate hard disks, and the SeaBIOS manages the booting. The debugging client is a Dell Inspiron 15K laptop with Ubuntu 12.04 LTS. It uses a 2.4 GHz Intel Core 15-2430M CPU and 6 GB DDR3 RAM. A USB-to-serial cable is used to connect the two machines.

To demonstrate that embodiments herein are capable of debugging kernels and hypervsiors, the OS kernels and domain 0 of a Xen hypervisor are intentionally crashed and then use embodiments herein to debug them. For the Linux kernel and domain 0 of the Xen hypervisor, the command echo c>/proc/sysrq-trigger is run, which performs a system crash by a NULL pointer dereference. To force a Blue Screen of Death (BSOD) in Windows, a new value named CrashOnCtrlScroU is created in the registry key HKEY_LOCAL_MACHSNE\System\CuircntControlSet\Serrices\i8042prt\Parameters and set it equal to a REGJDWORD value of 0x01. Then, the BSOD can be initiated by holding the Ctrl key and pressing the Scroll Lock key twice. After a system crashes, embodiments herein can start a debugging session by sending an SMI triggering message. In experiments conducted, embodiments herein are able to examine all the CPU registers and the physical memory of the crashed systems.

In order to understand the performance of embodiments disclosed herein, the time elapsed during particular operations is measured in the SMI handler. The Time Stamp Counter (TSC) is used to measure the number of CPU cycles elapsed during each operation; and multiplied the clock frequency by the delta in TSCs. After a performance counter triggers an SMI, the system hardware automatically saves the current architectural state into RAM and begins executing the SMI handler. The first operation in the SMI handler is to identify the last running process in the CPU. If the last running process is not the target malware, only the performance counter register for the next SMI needs to be configured and exited from SMM. Otherwise, several checks are performed. First, a check is made for newly received messages and whether a breakpoint has been reached. If there are no new commands and no breakpoints to evaluate, the performance counter registers are configured for the next SMI. Table 4 shows a breakdown of the operations in the SMI handler if the last running process is the target malware in the instruction-by-instruction stepping mode.

TABLE 4

| Operations | Mean | STB | 95% CX |
|---|---|---|---|
| SMM switching | 3.29 | 0.08 | [3.27, 3.32] |
| Command and BP checking | 2.19 | 0.09 | [2.15, 2.22] |
| Next SMI configuration | 1.66 | 0.06 | [1.64, 1.69] |
| SMM resume | 4.58 | 0.10 | 14.55, 4.61] |
| Total | 11.72 | | |

Table 4 shows the mean, standard deviation, and 95% confidence interval of 25 runs. The SMM switching time takes about 3.29 microseconds. Command checking and breakpoint checking take about 2.19 microseconds in total. Configuring performance monitoring registers and SMI stains registers for subsequent SMI generation takes about 1.66 microseconds. Lastly, SMM resume takes 4.58 microseconds. Thus, embodiments herein take about 12 microseconds to execute an instruction without, debugging command communication.

In order to demonstrate the efficiency of embodiments disclosed herein, the performance overhead of the four stepping methods is measured on both Windows and Linux platforms. A popular benchmark program is used, SuperPI version 1.8, on Windows and version 2.0 on Linux. SuperPI is a single-threaded benchmark that calculates the value of π to a specific number of digits and outputs the calculation time. This tightly written, arithmetic-intensive benchmark is suitable for evaluating CPU performance. Additionally, four Linux commands (ls, ps, pwd, and tar) are used to measure the overhead. ls is executed with the root directory; pwd is executed under the home directory; and tar is used to compress a hello-world program with 7 lines of C code. Cygwin is installed on Windows to execute these commands. First, the programs are run and record their runtimes. Next each of the four stepping methods are enabled separately and the runtimes are recorded. SuperPI calculates 16K digits of it, and shell scripts are used to calculate the runtimes of the Linux commands. Table 5 shows the performance slowdown introduced by the step-by-step debugging. The first column specifies four different stepping methods; the following five columns show the slowdown on Windows, which is calculated by dividing the current running time by the base running time; and the last five columns show the slowdown on Linux.

TABLE 5

| | Windows | | | | | Linux | | | | |
|---|---|---|---|---|---|---|---|---|---|---|
| Stepping methods | π | ls | ps | pwd | tar | π | ls | ps | pwd | tar |
| Retired far control transfers | 2 | 2 | 2 | 3 | 2 | 2 | 3 | 2 | 2 | 2 |
| Retired near returns | 30 | 21 | 22 | 28 | 29 | 26 | 41 | 28 | 10 | 15 |
| Retired taken branches | 565 | 476 | 527 | 384 | 245 | 192 | 595 | 483 | 134 | 159 |
| Retired instructions | 973 | 880 | 897 | 859 | 704 | 349 | 699 | 515 | 201 | 232 |

It can be seen that far control transfer (e.g., call instruction) stepping only introduces a 2× slowdown on Windows and Linux, which facilitates coarse-grained tracing for malware debugging. As expected, fine-grained stepping methods introduce more overhead. The instruction-by-instruction debugging causes about 973× slowdown on Windows for running SuperPI, which demonstrates the worst-case performance degradation in the four debugging methods. This high runtime overhead is due to the 12-microsecond cost of every instruction (as shown in Table 5) in the instruction-stepping mode. One way to improve the performance is to reduce the time used for SMM switching and resume, operations by cooperating with hardware vendors. Note that embodiments herein are three times as fast as other solutions in the single-stepping mode.

Despite a three order-of-magnitude slowdown on Windows, the debugging target machine is still usable and responsive to user interaction. In particular, the instruction-by-instruction debugging is intended for use by a human operator from the client machine, and the user would not notice this overhead while entering the debugging commands (for example, Read Register) on the client machine. Achieving high transparency at the cost of performance degradation is necessary for certain types of malware analysis. Note that the overhead in Windows is larger than that in Linux. This is because (1) the semantic gap problem is solved differently in each platform, and (2) the implementations of the benchmark programs are different.

Embodiments herein have been explained considering processors/CPUs with a x86 architecture, but it may be obvious to a person of ordinary skill in the art to use any other processor/CPU to implement embodiments as disclosed herein.

Embodiments herein use the terms 'server', 'debugging server' and 'target machine' interchangeably and all these terms refer to the server 202, as described herein.

Embodiments herein can run on two or more physical machines connected by a serial cable. Embodiments herein have been tested with popular packing, anti-debugging, anti-virtualization, and anti-emulation techniques. The experimental results show that embodiments herein remain transparent against these techniques. Since embodiments herein run on a bare-metal machine, antivirtualization techniques will no longer work on it. Additionally, embodiments herein do not change any code or the running environments of operating systems and applications so that normal anti-debugging techniques cannot work against it. For example, the debug flag in the PEB structure on Windows will not be, set while debugging is being performed. Additionally, experiments demonstrate that embodiments herein are able to debug crashed kernels/hypervisors. Embodiments herein introduce a reasonable overhead: it takes about 12 microseconds on average to execute the debugging code without command communication.

Moreover, popular benchmarks are used to measure the performance overhead for the four types of step-by-step execution on Windows and Linux platforms. The overhead ranges from 2 to 973 times slowdown on the target system, depending on the user's selected instrumentation method.

Embodiments herein isolate the execution in the CPU and the running environment of the debugger is more transparent than those of previous systems/solutions.

Embodiments herein transparently analyze malware with minimum footprints. Embodiments herein run potential malware in a Virtual Machine (VM) or emulator and use an analysis program to introspect the malware from the outside so that the malware cannot infect the analysis program. Embodiments herein aim to increase the debugging transparency, and can be used by security companies or researchers for malware analysis that requires high transparency. As embodiments herein run debugging code in SMM, far fewer artifacts are exposed to the malware, enabling a more transparent execution environment for the debugging code than existing approaches. Embodiments herein do not leave artifacts introduced by the debugging functions. Embodiments herein are OS-agnostic and immune to hypervisor attacks (for example, VM-escape attacks). Compared to existing bare-metal malware analysis, SMM has the same privilege level as hardware. Thus, embodiments herein are capable of debugging and analyzing kernel and hypervisor rookits as well. Embodiments herein do not depend on virtualization or emulation and thus, is immune to threats targeting such environments. Embodiments herein reduce the attack surface at the software level.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for debugging a target application having potential malware, the method comprising
    triggering a System Management Interrupt (SMI) by a server, on receiving a triggering message from a client;
    entering a System Management Mode (SMM) by the server, on receiving at least one debugging command from the client, wherein interrupts handled by an operating system are disabled upon entry into the SMM, and wherein a subsequent SMI is configured by using a performance counter of the server;
    executing debugging commands on the target application by the server in SMM, wherein the server receives the debugging commands from the client, the debugging commands being executed within the SMI handler to make operation of the server transparent to the target application and underlying operating system; and
    sending a response message by the server to the client, the response message including information requested by a debugging command to debug the target application.

2. The method, as claimed in claim 1, wherein the client comprises a debugger, wherein the debugger implements at least one of GDB (GNU Project Debugger); and IDAPro (Interactive Disassembler).

3. The method, as claimed in claim 1, wherein triggering the SMI by the server comprises:
    rerouting a serial interrupt; and
    asserting the SMI using at least one of software and hardware.

4. The method, as claimed in claim 1, wherein executing debugging commands comprises of using at least one of instruction-by-instruction stepping; and retired near returns event.

5. The method, as claimed in claim 1, wherein the method further comprises of:
    sending a breakpoint bit message by the server, on the server hitting a breakpoint during execution; and
    staying in SMM by the server until the server receives further debugging commands.

6. A system for debugging a target application having potential malware, the system comprising of a server and at least one client, the system being configured to:
    trigger a System Management Interrupt (SMI) by the server, on receiving a triggering message from the client;
    enter a System Management Mode (SMM) by the server, on receiving at least one debugging command from the client, wherein interrupts handled by an operating system are disabled upon entry into the SMM, and wherein a subsequent SMI is configured by using a performance counter of the server;
    execute debugging commands on the target application by the server in SMM, wherein the server receives the debugging commands from the client, the debugging commands being executed within the SMI handler to make operation of the server transparent to the target application and underlying operating system; and
    send a response message by the server to the client, the response message including information requested by a debugging command to debug the target application.

7. The system, as claimed in claim 6, wherein the client comprises a debugger, wherein the debugger implements at least one of GDB (GNU Project Debugger); and IDAPro (Interactive Disassembler).

8. The system, as claimed in claim 6, wherein the server is configured to trigger the SMI by:
    rerouting a serial interrupt; and
    asserting the SMI using at least one of software and hardware.

9. The system, as claimed in claim 6, wherein executing debugging commands comprises of using at least one of instruction-by-instruction stepping; and retired near returns event.

10. The system, as claimed in claim 6, wherein the system is further configured to:
   send a breakpoint bit message by the server, on the server hitting a breakpoint during execution; and
   stay in SMM by the server until the server receives further debugging commands.

\* \* \* \* \*